United States Patent
Hall et al.

(10) Patent No.: US 10,371,266 B2
(45) Date of Patent: Aug. 6, 2019

(54) FLEXIBLE SEALING RING FOR VALVES

(71) Applicant: Chromatic Industries, Inc., Conroe, TX (US)

(72) Inventors: Harold Wayne Hall, Conroe, TX (US); Miguel Barroso, Jr., Conroe, TX (US)

(73) Assignee: Chromatic Industries, Inc., Conroe, TX (US)

( * ) Notice: Subject to any disclaimer, the term of this patent is extended or adjusted under 35 U.S.C. 154(b) by 39 days.

(21) Appl. No.: 15/423,120

(22) Filed: Feb. 2, 2017

(65) Prior Publication Data
US 2018/0216743 A1    Aug. 2, 2018

(51) Int. Cl.
*F16K 3/02* (2006.01)
*F16K 31/126* (2006.01)
*F16K 1/20* (2006.01)
*F16K 5/06* (2006.01)

(52) U.S. Cl.
CPC .......... *F16K 3/0227* (2013.01); *F16K 1/2085* (2013.01); *F16K 5/0668* (2013.01); *F16K 5/0689* (2013.01); *F16K 31/126* (2013.01)

(58) Field of Classification Search
CPC .... F16K 3/0227; F16K 5/0668; F16K 5/0689; F16K 31/126; F16K 1/2085
USPC ....................... 251/335.3, 170–172, 359–365
See application file for complete search history.

(56) References Cited

U.S. PATENT DOCUMENTS

| | | | | |
|---|---|---|---|---|
| 2,859,770 A * | 11/1958 | Buivid | ............... | F16K 24/04 137/508 |
| 3,019,812 A * | 2/1962 | Rumsey | ............... | B01J 3/002 137/557 |
| 3,233,862 A * | 2/1966 | Marsh | ............... | F16K 3/0227 251/172 |
| 3,266,769 A * | 8/1966 | Shand | ............... | F16K 5/0673 251/172 |
| 3,774,881 A * | 11/1973 | Gregory | ............... | F16K 41/10 251/335.3 |
| 4,151,862 A * | 5/1979 | Ueda | ............... | F16K 31/0655 137/629 |
| 4,342,328 A * | 8/1982 | Matta | ............... | B60K 15/077 251/335.3 |
| 4,747,578 A * | 5/1988 | Kivipelto | ............... | F16K 5/207 251/172 |
| 4,815,699 A * | 3/1989 | Mueller | ............... | F16K 41/10 251/170 |
| 6,305,665 B1 * | 10/2001 | Coura | ............... | F16K 41/103 251/319 |
| 8,403,296 B2 | 3/2013 | Phillips | | |
| 2013/0168591 A1 * | 7/2013 | Webster | ............... | F16K 3/0236 251/328 |

* cited by examiner

*Primary Examiner* — John Bastianelli

(57) ABSTRACT

A sealing ring is usable in a valve, and has an inner diameter defining a shape of the sealing ring. The shape may be configured to match the shape of a flow bore of the valve. A first side of the sealing ring is configured to abut a body wall of the valve. A profiled face is on a second side opposite the first side, and the profiled face is configured to match a closure member. An outer radial groove cutout is on an outer side between the first side and the second side, and an inner radial groove cutout is on an inner side between the first side and the second side. The outer radial groove cutout and the inner radial groove cutout are configured to elastically deform.

5 Claims, 3 Drawing Sheets

US 10,371,266 B2

FLEXIBLE SEALING RING FOR VALVES

FIELD

Embodiments usable within the scope of the present disclosure relate, generally, to valves usable in controlling fluid flow. In particular, the embodiments include sealing components with the ability to be axially compressed and for use in low-pressure and high-pressure situations without losing seal integrity.

BACKGROUND

Flow control valves, such as ball valves or gate valves, can include a valve body or housing having an interior cavity and a fluid flow channel extending through the housing. For ball valves, a ball member may be located within the cavity and is provided with an axial throughbore, which is selectively aligned with, or disposed transverse to, the fluid channels in the housing, by rotating the ball member about an axis of rotation to control the flow of fluid through the fluid channels. For more robust services, such as undersea, or deep well valves, gate valves may provide more reliable sealing under harsh service conditions. For example, the well conditions may include high pressure, wide temperature ranges, the presence of corrosive fluids, sand particles, debris and the like. Additionally, some wells may experience a broad range of pressures. In low-pressure conditions, the gate valve may lose sealing integrity. Or, if the gate valve, ball valve, or other valve has been designed to seal tightly under low-pressure conditions, the valve may lose sealing integrity under high pressure conditions. Furthermore, a valve designed for low-pressure sealing may succumb to a faster rate of deterioration when subjected to high-pressure conditions. A number of valves have used various forms of seals, which have been formed of elastomeric or other non-metallic materials, and fitted at the locations required for sealing against fluid leakage.

In valve arrangements of the aforementioned type, seat life and fluid leakage has been a reoccurring problem.

Therefore, there is a need for a fluid flow control valve that obviates problems by providing a novel sealing member having an elastic range to exert a force capable of sealing under low-pressure and under high-pressure conditions.

SUMMARY

Embodiments usable within the scope of the present disclosure relate, generally, to flow control valves, components for controlling the flow of fluids through said valves, and methods of manufacturing said components.

An embodiment may include a sealing ring usable in a valve, having an inner diameter defining a shape of the sealing ring. The shape may be configured to match the shape of a flow bore of the valve. Certain embodiments may also include a first side configured to abut a body wall of the valve, a profiled face on a second side opposite the first side, wherein the profiled face is configured to match a closure member, an outer radial groove cutout on an outer side between the first side and the second side, and an inner radial groove cutout on an inner side between the first side and the second side, wherein the outer radial groove cutout and the inner radial groove cutout are configured to elastically deform.

In certain embodiments, the shape of the sealing ring may include a circle, ellipse, rectangle, square, or combinations thereof, or a seat around at least a portion of a circumference of the sealing ring.

Certain embodiments may also include an outer face configured to match a shape of a countersink of the valve.

In certain embodiments, the inner radial groove or the outer radial groove may include a groove angle that depresses when the valve is under high pressure, and returns to the groove angle when the valve is under low pressure. And, the profiled face comprises a regular shape, such as a flat shape, spherical shape, or conical shape, an irregular shape, or any combinations thereof.

In certain embodiments, the sealing ring may include a metallic material, polymer material, plastic material, ceramic material, or any combinations thereof.

Embodiments disclosed in this description may also include a method of producing a sealing ring usable in a valve. Embodiments of the method may include forming a shape of the sealing ring. The shape may be configured to match the shape of a flow bore of the valve. The method may also include cutting an outer radial groove cutout, cutting an inner radial groove cutout, wherein the outer radial groove cutout and the inner radial groove cutout are configured to elastically deform, and forming a profiled face on a second side opposite the first side. The profiled face may be configured to match a closure member.

Embodiments of the method may include forming a seat around at least a portion of a circumference of the sealing ring. Furthermore, cutting the inner radial groove cutout or outer radial groove cutout may include cutting a groove angle that depresses when the valve is under high pressure, and returns to the groove angle when the valve is under low pressure.

Additionally, forming the profiled face may include forming a regular shape, such as a flat shape, spherical shape, or conical shape, an irregular shape, or combinations thereof, and forming the shape of the sealing ring may include forging, molding, milling, or any combinations thereof.

Embodiments of the current disclosure may also include a valve having a body wall comprising a flow bore and a sealing ring, and a closure member.

BRIEF DESCRIPTION OF THE DRAWINGS

So that the manner in which the above recited features, advantages and objects of this disclosure are attained and may be understood in detail, a more particular description, briefly summarized above, may be had by reference to the embodiments thereof which are illustrated in the appended drawings.

DETAILED DESCRIPTION

Before describing selected embodiments of the present disclosure in detail, it is to be understood that the present invention is not limited to the particular embodiments described herein. The disclosure and description herein is illustrative and explanatory of one or more embodiments and variations thereof, and it will be appreciated by those skilled in the art that various changes in the design, organization, order of operation, means of operation, equipment structures and location, methodology, and use of mechanical equivalents can be made without departing from the scope of the invention.

As well, it should be understood that the drawings are intended to illustrate and plainly disclose selected embodiments to one of skill in the art, but are not intended to be manufacturing level drawings or renditions of final products and can include simplified conceptual views as desired for easier and quicker understanding or explanation. As well, the relative size and arrangement of the components can differ from that shown and still operate within the scope of the invention. It should also be noted that like numbers appearing throughout the various embodiments and/or figures represent like components.

Moreover, it should also be understood that various directions such as "upper," "lower," "bottom," "top," "left," "right," and so forth are made only with respect to explanation in conjunction with the drawings, and that the components can be oriented differently, for instance, during transportation and manufacturing as well as operation. Because many varying and different embodiments can be made within the scope of the concepts herein taught, and because many modifications can be made in the embodiments described herein, it is to be understood that the details herein are to be interpreted as illustrative and non-limiting.

Embodiments usable within the scope of the present disclosure relate, generally, to valves used to control the flow of fluids, and more particularly, but not by way of limitation, to sealing members having an axially elastic range, which results in drastically improved sealing at low pressure and high pressure. Furthermore, the increased ability to seal at large pressure differentials increases the life of the valve significantly.

Figure 1:
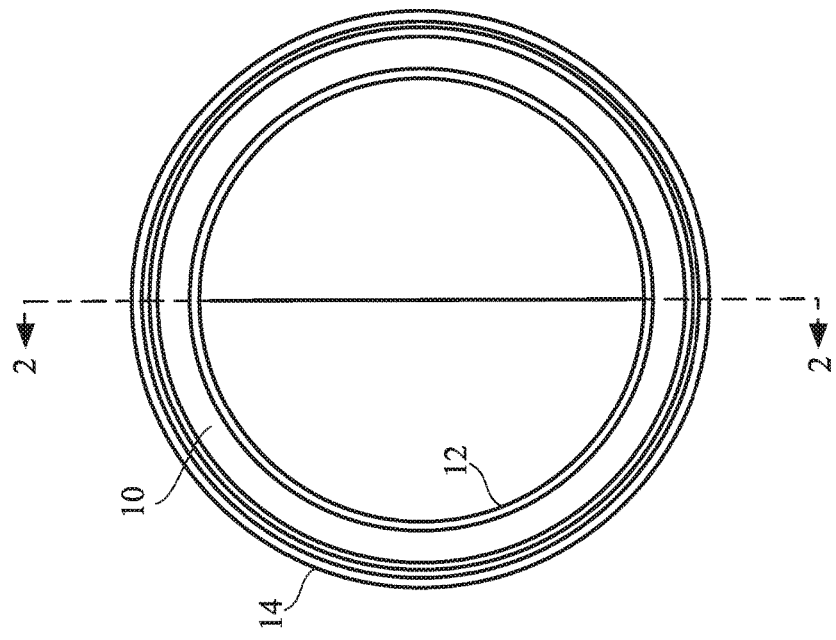
FIG. 1 depicts a side view of an embodiment of a device usable within the scope of the present disclosure, which includes an embodiment of the sealing ring.

Referring now to the figures, FIG. 1 depicts a perspective view of an embodiment of a sealing ring 10 in accordance with the present invention. The sealing ring 10 may surround a flow bore 28 and is designed to maintain a seal while the valve is closed, but to remain in place when the valve is open, without degrading or losing seal integrity due to the sometimes corrosive fluids and debris passing through the valve. The sealing ring 10 includes an inner side 12 defining an inner shape of the sealing ring 10. The shape of the sealing ring 10 may be designed to 'match' the shape of the flow bore of the valve. Matching the shape of the flow bore means that the inner diameter 12 of the sealing ring 10 and the inner diameter of the flow bore 28 do not vary more than a given tolerance for the entire circumference of the sealing ring 10. Thus, a sealing ring 10 with a square shape that is sealing a flow bore 28 with a circular shape would not match the shape of the flow bore 28, but a sealing ring 10 that was ⅛ inches bigger than the flow bore 28 over the entire circumference of the flow would match.

FIG. 1 shows that the sealing ring 10 can include an inner side 12 with a circular shape. Embodiments within the scope of this disclosure also include other non-circular, closed shapes. For example, the sealing ring 10 and flow bore 28 may be an ellipse, rectangle, square, or combinations thereof. The sealing ring 10 may also include an outer side 14. The outer side 14, as illustrated, may resemble the shape of the inner side 12 of the sealing ring 10. That is, both the inner side 12 and the outer side 14 may be circular as shown in FIG. 1. In certain other embodiments that are not depicted, the outer side 14 may have a shape that is different than the inner side 12.

Embodiments usable within the scope of the present disclosure also relate to methods of manufacturing the sealing ring 10. The sealing ring 10 may be manufactured from a variety of materials, which influence the manufacturing technique that may be used. For example, the sealing ring 10 may be manufactured from a metallic material, and the technique may utilize a milling machine, or any other similar device, to mill or cut the sealing ring 10 from a single work piece (not shown). As described in detail below, the sealing ring 10 may include a number of features that may also be milled or cut from the sealing ring 10. Additionally and alternatively, the sealing ring 10 may be manufactured from plastic, rubber, or polymer material, and the technique for manufacture may include a molding process or a curing process. The sealing ring 10 may also be manufactured from ceramic materials or a combination of materials that allow the ceramics to be flexible in response to changes in pressure, temperature, or other conditions that the sealing ring 10 encounters.

Figure 2:
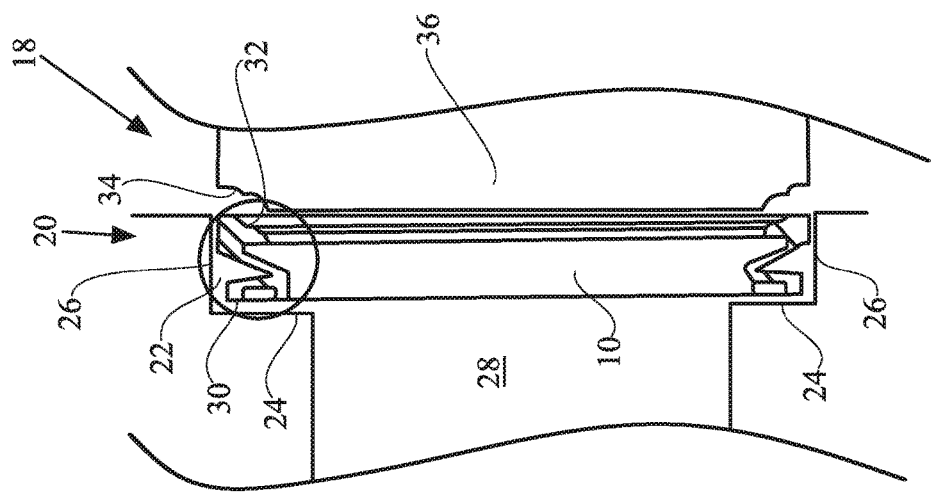
FIG. 2 depicts a cross sectional view of an embodiment of a device usable within the scope of the present disclosure.
Figure 4:
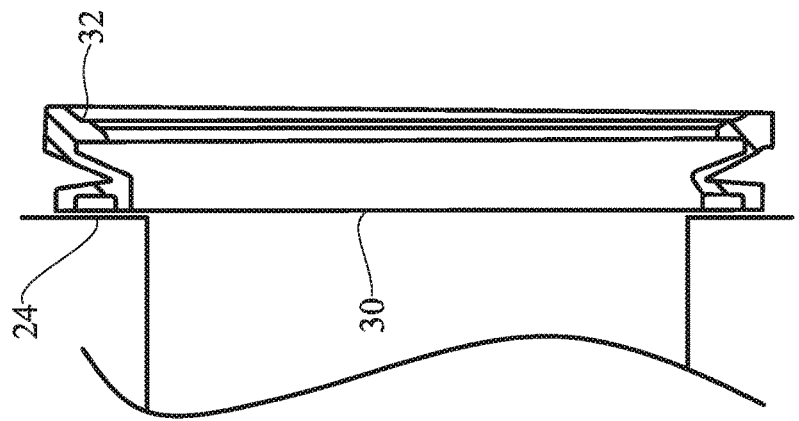
FIG. 4 depicts a cross-sectional view of an embodiment of a device usable within the scope of the present disclosure.

FIG. 2 illustrates an embodiment of the sealing ring 10 placed within a valve 18. In this illustrated embodiment, the valve 18 includes a valve housing 20 with a countersink 22 into which the sealing ring 10 is fitted. The countersink 22 of the valve housing 20 includes a body wall 24 and a side wall 26. The side wall 26 of the illustrated embodiment matches the shape of the outer side 14 of the sealing ring 10. Certain embodiments may have the side wall 26 match the shape of the outer ring 14 for only a portion of the outer ring 14. For example, a round sealing ring 10 may be housed in a countersink 22 with a side wall 26 that is square. Furthermore, as illustrated in FIG. 4 below, the valve housing 20 may include only the body wall 24.

In the illustrated embodiment, the sealing ring 10 includes a first side 30 configured to abut the body wall 24 that surrounds a flow bore 28 of the valve housing 22. The abutment of the first side 30 and the body wall 24 provides a seal that is maintained over a broad range of pressures. In certain embodiments, the seal is maintained due in part to the centering action between a profiled face 32 on a second side opposite the first side 30 of the sealing ring 10. The profiled face 32 is shaped and/or configured to match a profile 34 of a closure member 36. The profiled face 32 may include a chamfered or angled surface with a flat shape, spherical shape, conical shape, or other regular shape, an irregular shape or combinations thereof that contacts the closure member 36 when the valve 18 closes. The profiled face 32 may also have a combination of shapes, for example a flat shape on part of the profiled face 32 and a spherical shape on a different part of the profiled face 32. The closure member 36 presses into the sealing ring 10 when the valve 18 closes, and the profiled face 32 floats, or slides over the profile 34 until the matching surfaces center the sealing ring 10 around the flow bore 28.

Figure 3:
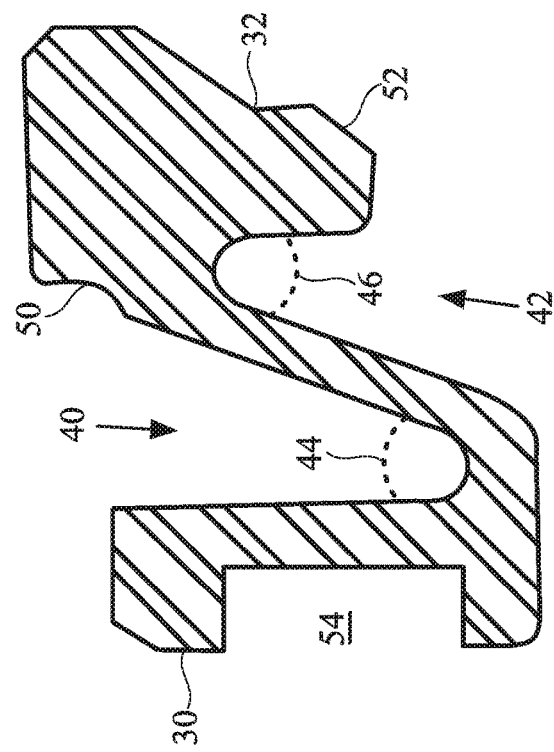
FIG. 3 depicts a cross sectional detailed view of an embodiment of a device usable within the scope of the present disclosure.

FIG. 3 illustrates a cross-section of the sealing ring 10. The sealing ring 10 includes an outer radial groove cutout 40 and an inner radial groove cutout 42 that enable flexing and elasticity in multiple directions. When the closure member 36 closes onto the profiled face 32, the outer radial groove cutout 40 and the inner radial groove cutout 42 depress or deform somewhat. For example, the outer radial groove cutout 40 may have a groove angle 44 that decreases when the closure member 36 closes, or when a change in conditions occurs within the flow bore 28. The groove angle 44 may then return to the normal angle when the conditions return, or when the closure member 36 opens. The original groove angle 44 may have an angle that is 20 degrees. In certain embodiments, the groove angle 44, at rest, may be between 15 and 25 degrees, or may be between 5 and 45 degrees. To complement the outer groove angle 44, the inner radial groove cutout 42 may also have a groove angle 46. In certain embodiments, the outer groove angle 44 is the same as the inner groove angle 46, but the angles 44, 46 do not have to be the same. The amount of depression may vary between embodiments, for a given amount of force. For example, one embodiment of the sealing ring 10 may depress the groove angle 44 only 2 to 3 degrees while a different sealing ring 10 experiencing the same force may depress greater than 5 degrees.

Additionally, the angles 44, 46 may flex differently in response to different changes in the conditions. For example, one angle, e.g., groove angle 44, may depress 2 to 3 degrees while the other angle, e.g., groove angle 46, depresses 5 to 6 degrees when the closure member 36 closes. The difference in the amount of depression may be caused by design factors including material composition and structural formation. For example, the outer radial groove cutout 40 may include reinforcing structures milled into the sealing ring 10 that are not milled into the inner radial groove cutout 42. In another exemplary embodiment, the outer radial groove cutout 40 may include a softer material formed into the corner of the groove angle 44, which would cause a greater degree of depression when the closure member 36 closes.

The sealing ring 10 may also include a number of features that increases the efficacy and integrity of the seal among the body wall 24, the sealing ring 10, and the closure member 36. For example, the outer side of the sealing member 10 may include a first hump 50, while the profile face 32 includes a second hump 52, to increase the interconnected relationship between different components. e.g., the sealing ring 10 and the closure member 36. That is, the closure member 36 may have a similarly shaped divot or groove on the profile 34. When the second hump 52 contacts the profile 34, the profile 34 can, in certain embodiments, snap into place. Snapping into place forces the sealing ring 10 into a desired location with respect to the body wall 24, creating the optimal seal between the body wall 24 and the first side 30. The first side 30 may include a cutout feature 54 as well that can also increase the integrity and strength of the seal.

In certain embodiments, the seal between the body wall 24 and the first side 30 may be secure enough that the countersink 22 is undesirable. As shown in FIG. 4, the closure member 36 can correct misalignment such that equal loading around the circumference of the sealing ring 10 is achievable. The shape, composition, and structure of the sealing ring 10, including the inner and outer radial groove cutouts (40, 42), create a flexible spring characteristics that prevent any compromising of the seal. The valve 18 using the embodiments of the sealing ring 10 contemplated and disclosed herein will have increased wearability while maintaining an ideal seal.

Figure 5:
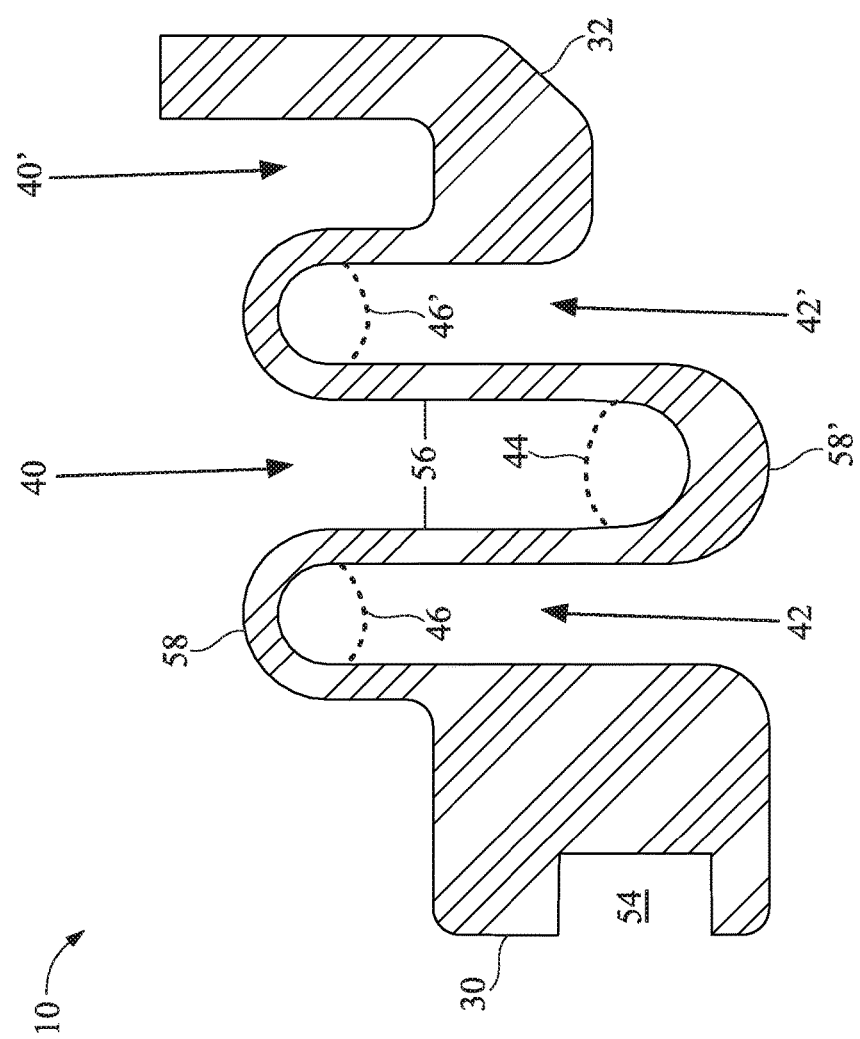
FIG. 5 depicts a cross-sectional view of an embodiment of a device usable within the scope of the present disclosure.

FIG. 5 shows a cross-sectional view of an embodiment of the sealing ring 10 having multiple inner radial groove cutouts 42, 42' and multiple outer radial groove cutouts 40, 40'. The sealing ring 10, as illustrated in FIG. 5, may have cutout 54 on the first side 30 for maintaining pressure sealing against body wall 24 as shown in FIG. 3, in a manner similar to cutout 54 illustrated in FIG. 3. Between the first side 30 and the profiled face 32, however, the sealing ring 10 illustrated in FIG. 5 includes two inner radial groove cutouts 42, 42'. The inner radial groove cutouts 42, 42' have groove angles 46, 46' that are rounded, which enable plates 56 to be parallel for at least a portion of the distance between one inner radial groove cutout 42 and the next outer radial groove cutout 40. The plates 56 of FIG. 5 are shown parallel and flat for most of the distance between one inner radial groove cutout 42 and the next outer radial groove cutout 40, but in other embodiments, the plates 56 may be short such that the rounded portion 58 of one inner radial groove cutout 42 connects to the rounded portion 58' of an adjacent outer radial groove cutout 40. Indeed, the radial groove cutouts 40, 40', 42, 42' may be larger or smaller to increase or decrease the amount of travel of the profiled face 32 when the closure member 36, as shown in FIG. 3, is closed down on the sealing ring 10.

When the closure member 36, as shown in FIG. 3, is closed down on the sealing ring 10 illustrated in FIG. 5, radial groove cutouts 40, 40', 42, 42' may depress further than the embodiment illustrated in FIG. 3, which increases the pressure against the closure member 36 and against the body wall 24 as shown in FIG. 3. The increased pressure helps to maintain an even better seal that does not change with changing conditions (pressure, temperature, etc.) within the location of the valve 18. Furthermore, the increased depression may enable the sealing ring 10 to elastically expand radially without the first side 30 and the profiled face 32 shifting against the body wall 24 and the closure member 36, respectively. While the embodiment illustrated in FIG. 5 includes two inner radial groove cutouts 42, 42' and two outer radial groove cutouts 40, 40', other example embodiments may include 3, 4, 5, or more of each of the radial groove cutouts 40, 40', 42, 42' without deviating from the disclosed invention.

While various embodiments usable within the scope of the present disclosure have been described with emphasis, it should be understood that within the scope of the appended claims, the present invention can be practiced other than as specifically described herein.

What is claimed is:

1. A valve, comprising:
   a housing including a body wall, the housing comprising a flow bore, the flow bore for fluid flow in an axial direction;
   a sealing ring, comprising:
     an inner diameter configured to surround an opening of the flow bore;
     a first side configured to abut the body wall and comprising a cutout feature around at least a portion of a circumference of the sealing ring, wherein the cutout feature opens in the axial direction and forms a bounded space with the body wall of the valve;
     a profiled face on a second side opposite the first side;
     an outer radial groove cutout on an outer side between the first side and the second side; and
     an inner radial groove cutout on an inner side between the first side and the second side, wherein the outer radial groove cutout and the inner radial groove cutout are configured to elastically deform; and
   a closure member configured to close down on the sealing ring, wherein the profiled face is shaped to match the closure member.

2. The valve of claim 1, further comprising a countersink in the body wall, wherein the countersink is configured to match the shape of the sealing ring.

3. The valve of claim 1, wherein the inner radial groove cutout comprises an initial angle that decreases when the valve is under high pressure, and returns to the initial angle when the valve is under low pressure.

4. The valve of claim 1, wherein the sealing ring further comprises a second outer radial groove cutout and a second inner radial groove cutout.

5. The valve of claim 1, wherein the sealing ring comprises a metallic material, polymer material, plastic material, ceramic material, or combinations thereof.

* * * * *